(12) United States Patent
Harrington

(10) Patent No.: US 7,007,456 B2
(45) Date of Patent: Mar. 7, 2006

(54) DUAL CHAMBER PUMP AND METHOD

(76) Inventor: Steven M. Harrington, 1293 Blue Sky Dr., Cardiff, CA (US) 92007

( * ) Notice: Subject to any disclaimer, the term of this patent is extended or adjusted under 35 U.S.C. 154(b) by 252 days.

(21) Appl. No.: 10/404,036

(22) Filed: Mar. 31, 2003

(65) Prior Publication Data

US 2003/0221412 A1   Dec. 4, 2003

Related U.S. Application Data

(60) Provisional application No. 60/404,530, filed on Aug. 20, 2002, provisional application No. 60/378,217, filed on May 7, 2002.

(51) Int. Cl.
F02K 9/42       (2006.01)
F04F 1/06       (2006.01)

(52) U.S. Cl. .................. 60/259; 417/122; 417/125; 417/126; 417/147

(58) Field of Classification Search ............. 417/118, 417/121, 122, 123, 125, 126, 129–131, 134, 417/137, 145, 147; 60/257, 259
See application file for complete search history.

(56) References Cited

U.S. PATENT DOCUMENTS

| | | | |
|---|---|---|---|
| 1,306,762 A | | 6/1919 | Higginson |
| 3,213,804 A | * | 10/1965 | Sobey ................... 417/347 |
| 4,239,054 A | * | 12/1980 | Van Rijn ................ 137/209 |
| 4,678,040 A | * | 7/1987 | McLaughlin et al. ...... 166/370 |
| 5,092,743 A | | 3/1992 | Dietrich .................. 417/392 |
| 5,148,945 A | | 9/1992 | Geatz ....................... 222/1 |
| 5,832,948 A | | 11/1998 | Schell ...................... 137/93 |
| 6,095,759 A | | 8/2000 | Breslin .................... 417/131 |
| 6,200,104 B1 | * | 3/2001 | Park ........................ 417/118 |
| 6,213,348 B1 | | 4/2001 | Le Grouyellec ............ 222/61 |
| 6,314,978 B1 | | 11/2001 | Lanning et al. ............ 137/71 |
| 6,368,068 B1 | * | 4/2002 | Corlew et al. ............ 417/120 |
| 6,644,930 B1 | * | 11/2003 | Kuismanen ................ 417/53 |

OTHER PUBLICATIONS

Felix Godwin: Exploring the Solar System: Plenum Press, 1960 (pp 21-22).
Andrew Case: "Arocket Archives", Apr. 23, 2002 (http://blastzone.com/arocket/listarchivesmessage.asp?id_93173.

* cited by examiner

Primary Examiner—Charles G. Freay

(57) ABSTRACT

Disclosed is a pneumatically powered high-pressure and lightweight fluid pump. The pump is useful for pumping fuel for liquid rocket engines and for pumping water, such as for fire suppression. During operation of the pump, liquid is drained from a tank into a pump chamber and the chamber is then pressurized to deliver fluid. The chamber is then refilled from the main tank. An auxiliary chamber supplies fuel while the main chamber is being filled, thereby a steady stream is delivered from the pump. The auxiliary chamber is refilled from the tank while the main chamber is delivering fluid. The design results in substantial weight savings over a system in which the main tank is pressurized or a system with two pump chambers of similar size. The auxiliary chamber of the present disclosure has a smaller capacity than the main chamber. The main chamber is designed to be filled much faster than it is emptied, therefore the smaller auxiliary chamber supplies fluid only during the time while the larger main chamber is being filled.

15 Claims, 7 Drawing Sheets

DUAL CHAMBER PUMP AND METHOD

This application is a utility patent application that claims the benefit of U.S. Provisional Application Ser. No. 60/378,217 filed on May 7, 2002 and entitled "Lightweight Pistonless Pump," and U.S. Provisional Application Ser. No. 60/404,530 filed on Aug. 20, 2002 and entitled "Pneumatic Pistonless Pump with Accumulator", which are hereby fully incorporated herein as though set forth in full.

FIELD OF THE DISCLOSURE

The disclosure relates to pumps with multiple chambers and, more particularly, pumps with overlapping fill and dispense cycles.

BACKGROUND OF THE DISCLOSURE

Liquid fuel rocket engines require a supply of propellant at 300–8000 psi at a high flow rate and at a steady pressure. The propellant may be supplied from a tank at the required pressure or a pump may be used to raise the pressure of a propellant stored at low pressure. If a pump is used, it must be of minimum weight and have high reliability.

The most important factors for rocket performance are the type of propellant used and the empty or burnout mass of the rocket which contains a given amount of propellant. For any given propellant, the performance of a rocket depends on the weight of the propellant tanks, the weight of the engine and the weight of the pumps, if required. Each of these components must be as light as possible for optimum performance. Typically, there are two options for supplying propellant to the rocket engine, one way is to pressurize the tanks and the other way is to use a turbopump. Pressurizing the tanks, however, requires heavy tanks made from exotic and expensive high strength materials which reduce rocket performance because of their weight and increase the costs. If turbopumps are utilized, complexity of the rocket increases, and thus the reliability is decreased, and the costs are increased. Most all large liquid rockets from the V2 to the Atlas V's use a turbopump to supply fuel to the engine. In these rockets, the turbopump is one of the most complex components of the rocket system. Turbopumps typically rotate at 30,000–100,000 RPM to develop the power required for the rocket.

The cost of turbopumps reflect the large amount of engineering design and testing efforts that are required for turbopumps. Also, the manufacturing of turbopumps require precision machining of the exotic alloys. The failure of a turbopump usually results in an explosion, which can be disastrous to the rocket if the pump is filled with liquid oxygen. All of these items drive up the cost of a turbopumps. In addition, turbopumps cannot be run to the point of the fuel tank being empty due to problems with overspeeding and cavitation, both of which may also cause catastrophic failure. Therefore, a substantial amount of fuel must be left in the tank of the rocket that uses a turbopump, which increases the burnout weight of the rocket. A turbopump also requires a few seconds to startup, and during the startup time the rocket performance is not optimal.

SUMMARY OF THE DISCLOSURE

A dual chamber pump has a primary chamber having a primary chamber volume capacity, and an auxiliary chamber with an auxiliary chamber volume capacity, wherein the auxiliary chamber volume capacity is smaller than the primary chamber volume capacity.

In another aspect of the disclosure, a dual chamber pump has a primary chamber having a primary chamber volume capacity, and an auxiliary chamber with an auxiliary chamber volume capacity, wherein the auxiliary chamber volume capacity is smaller than the primary chamber volume capacity and wherein the primary chamber further has a primary chamber major axis and the auxiliary chamber is coaxially aligned with the primary chamber major axis.

In yet another aspect of the disclosure, a dual chamber pump has a primary chamber having a primary chamber volume capacity, and an auxiliary chamber with an auxiliary chamber volume capacity, wherein the auxiliary chamber volume capacity is smaller than the primary chamber volume capacity, and wherein the primary chamber and the auxiliary chamber have a stacked configuration.

In another aspect of the disclosure, a method of providing constant flow from a dual chamber pump includes the steps of filling a primary chamber and an auxiliary chamber with liquid from a tank, delivering the fluid from the main chamber, delivering the fluid from the auxiliary chamber, filling the main chamber while the auxiliary chamber is delivering the fluid, and filling the auxiliary chamber while the main chamber is delivering the fluid.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE DISCLOSURE

Disclosed is a pneumatically powered high-pressure and lightweight fluid pump. The pump is useful for pumping fuel for liquid rocket engines and for pumping water, such as for fire suppression, or any other situation which requires a low cost, efficient and reliable pump that provides a steady delivery stream. During operation of the pump, liquid is drained from a tank into a pump chamber and the chamber is then pressurized to deliver fluid. The chamber is then refilled from the main tank. An auxiliary chamber supplies fuel while the main chamber is being filled, thereby a steady stream is delivered from the pump. The auxiliary chamber is refilled from the tank while the main chamber is delivering fluid. The design results in substantial weight savings over a system in which the main tank is pressurized or a system with two pump chambers of similar size. The auxiliary chamber of the present disclosure has a smaller capacity than the main chamber. The main chamber is designed to be filled much faster than it is emptied, therefore the smaller auxiliary chamber supplies fluid only during the time while the larger main chamber is being filled.

Figure 1:
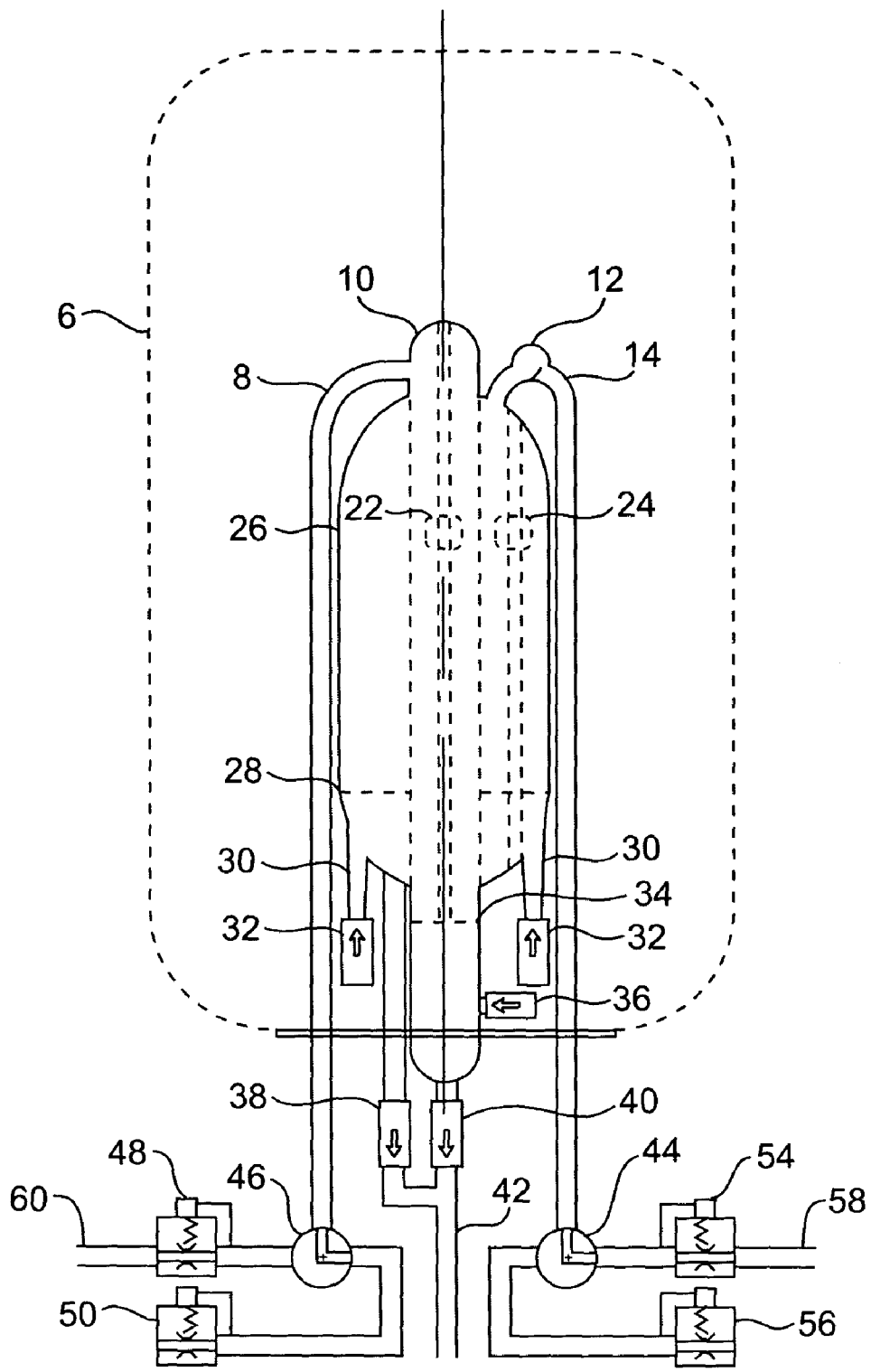
FIG. 1 is a cross sectional view of a dual chamber pump installed in a tank according to the present disclosure.

Referring to FIG. 1, a cross sectional view of the dual chamber pump according to the disclosure is shown installed internal of a storage tank 6. The dual chamber pump includes a main chamber 26 with one or more check valves 32. Multiple check valves distributed symmetrically about axis of the pump chamber axis allow the pump to be filled with a minimum of swirling. The main chamber 26 also has at least one diffuser 30 to allow the fluid to flow from the storage tank 6 into the main chamber 26. An outer float 24 is used to monitor the fluid level within the main chamber 26 and to determine when the main chamber 26 has been filled with fluid and to determine when the fluid has been drained from the main chamber 26. Also, a two position valve 44 is connected to the main chamber 26 and is used to either pressurize the main chamber 26 through a pressure regulator 54 or vent the main chamber 26 through a gas and water separator 12, and then through a back pressure regulator 56. An outlet check valve 38 and outline 42 are used to deliver the fluid to an engine, such as a rocket engine and to only allow the one way flow of fluid out of the main chamber 26 in the main chamber fluid delivery piping. The main chamber 26 also includes a supply line for receiving fluid from the storage tank 6.

An auxiliary chamber 10 has a smaller volume capacity relative to the main chamber 26. The auxiliary chamber 10 also has a smaller valve 36 used to fill the auxiliary chamber with fluid. The auxiliary chamber 10 also has a float level sensor 22 to sense the level of fluid in the auxiliary chamber 10 and to determine when the auxiliary chamber 10 has been filled with fluid and to determine when the fluid has been drained from the auxiliary chamber 10. The auxiliary chamber 10 also has an outlet check valve 40 that only allows the fluid in the auxiliary chamber 10 to flow one way, out of the auxiliary chamber 10 in the auxiliary fluid delivery piping. The auxiliary chamber 10 also includes a supply line 8 to pressurize the auxiliary chamber 10 through valve 46.

The main chamber 26 has a major axis that runs longitudinally along the length of the main chamber 26. Also, the auxiliary chamber 10 is coaxially aligned with the main chamber 26. This allows the dual pump to be stable during the fill and dispense cycles since the weight of the two chambers are on the same axis. This prevents weight shift during the pump cycles which would make the rocket vehicle more difficult to control.

In addition, since the auxiliary chamber 10 has a smaller volume capacity relative to the main chamber 26 which reduces the overall weight of the dual pump since the auxiliary chamber volume capacity provides the minimum amount of flow required while the main chamber 26 is being refilled with fluid from the storage tank 6.

A three position valve 46 is used to either pressurize the auxiliary chamber 10 through a regulator 48, seal the auxiliary chamber 10, or vent the auxiliary chamber 10 through a back pressure regulator 50.

Both the main chamber 26 and the auxiliary chamber 10 have baffles 28 and 34, respectively, to calm the fluid during entry into the chambers at high velocity. An electronic or pneumatic control system (not shown) maintains steady flow by controlling the multi position valves 44 and 46.

The dual pump has a single point level sensor for the auxiliary chamber 10, a two set point level sensor for the main chamber 26, a two position valve to supply pressurized gas to the outer chamber and a three position valve to supply pressurized gas to the auxiliary chamber. An air and liquid separator may be used in the vent and pressurize lines to prevent loss of the fluid or propellant. The system for supplying the gas at high pressure to drive the dual pump and pressure tanks of the disclosure are well known in the art.

Figure 4:
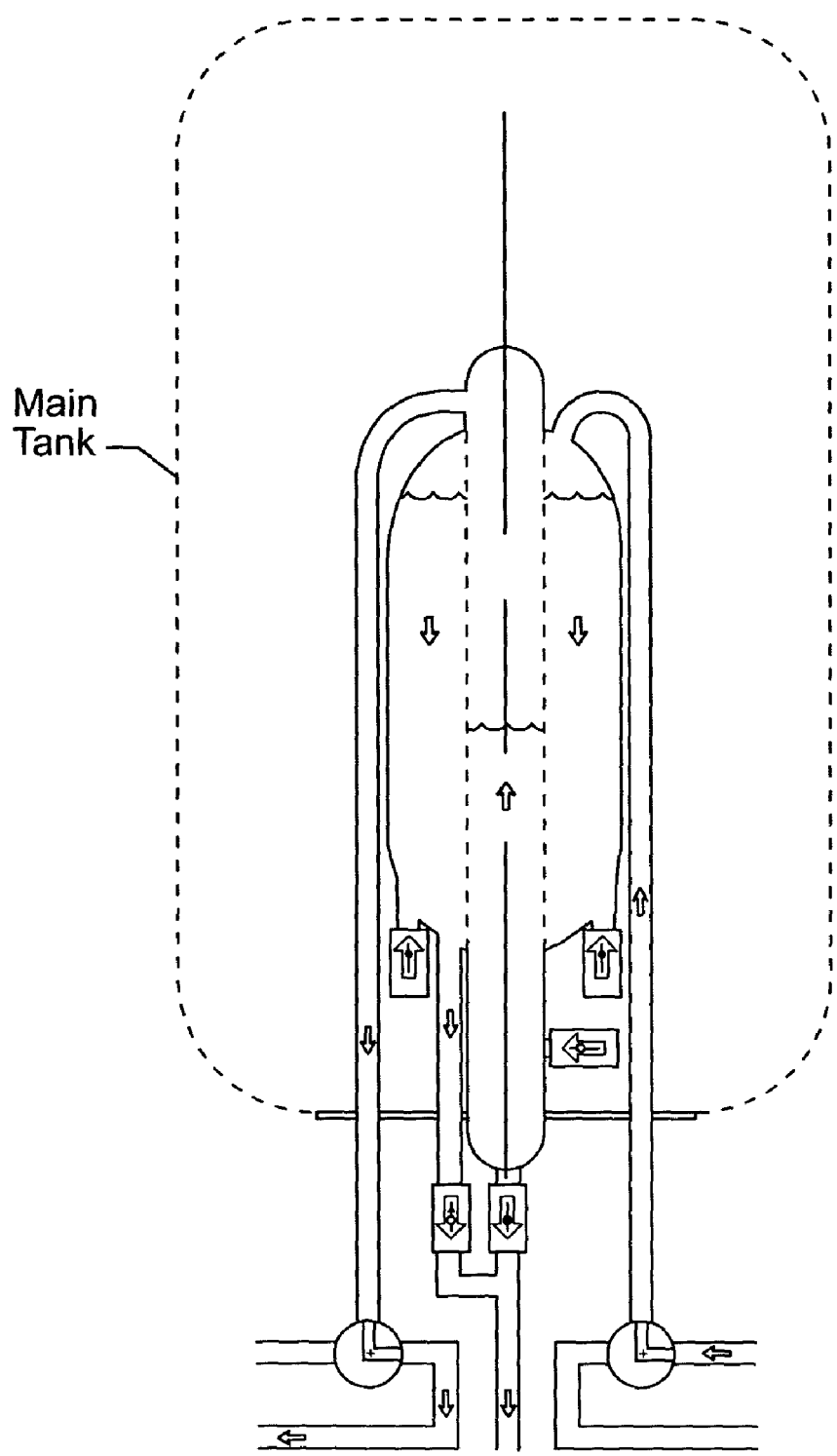
FIG. 4 is a cross sectional view of the dual chamber pump showing the main chamber dispensing fluid while the auxiliary chamber is being filled.
Figure 5:
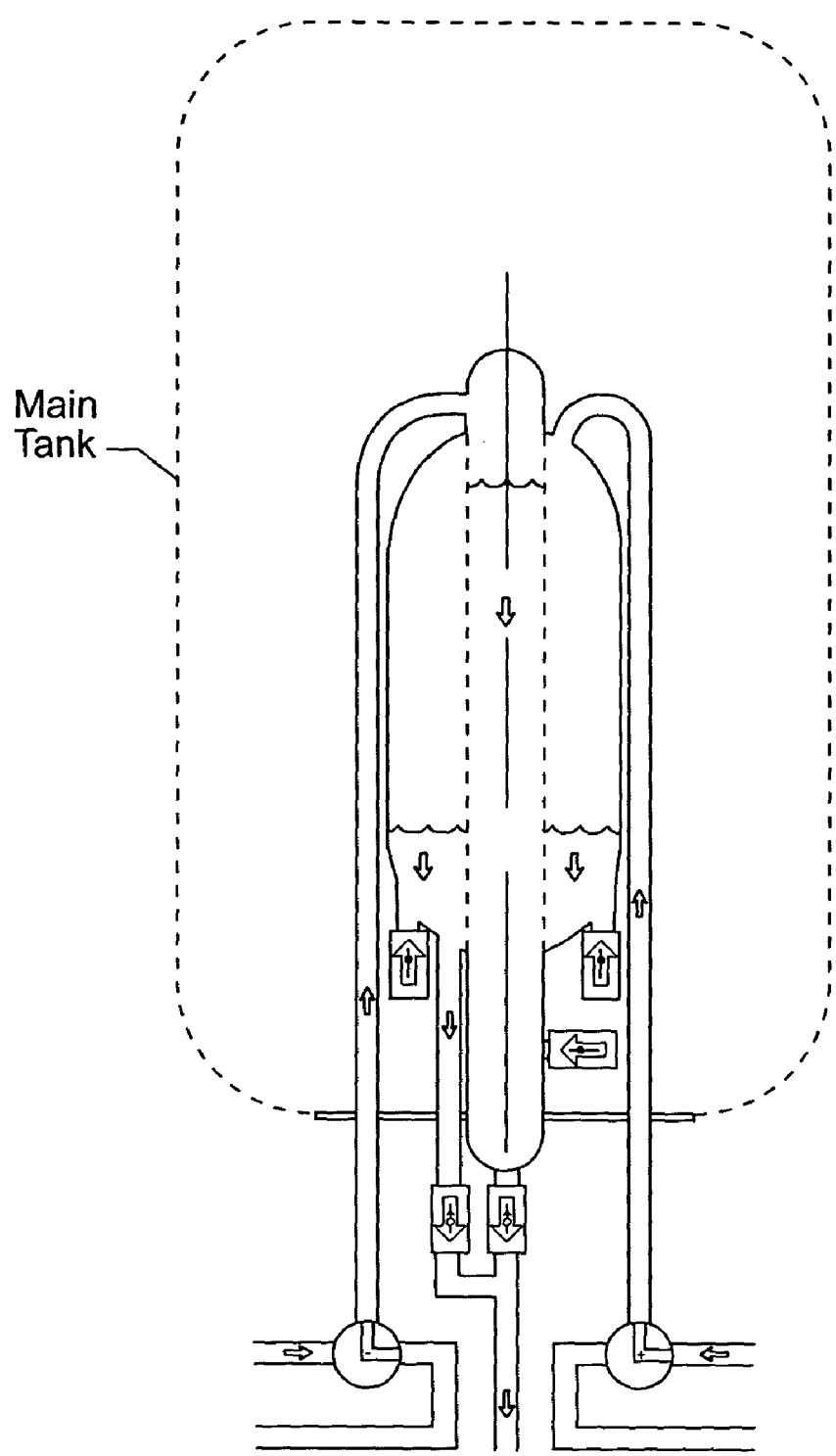
FIG. 5 is a cross sectional view of the dual chamber pump showing both chambers dispensing fluid as the main chamber is low on fluid.
Figure 6:
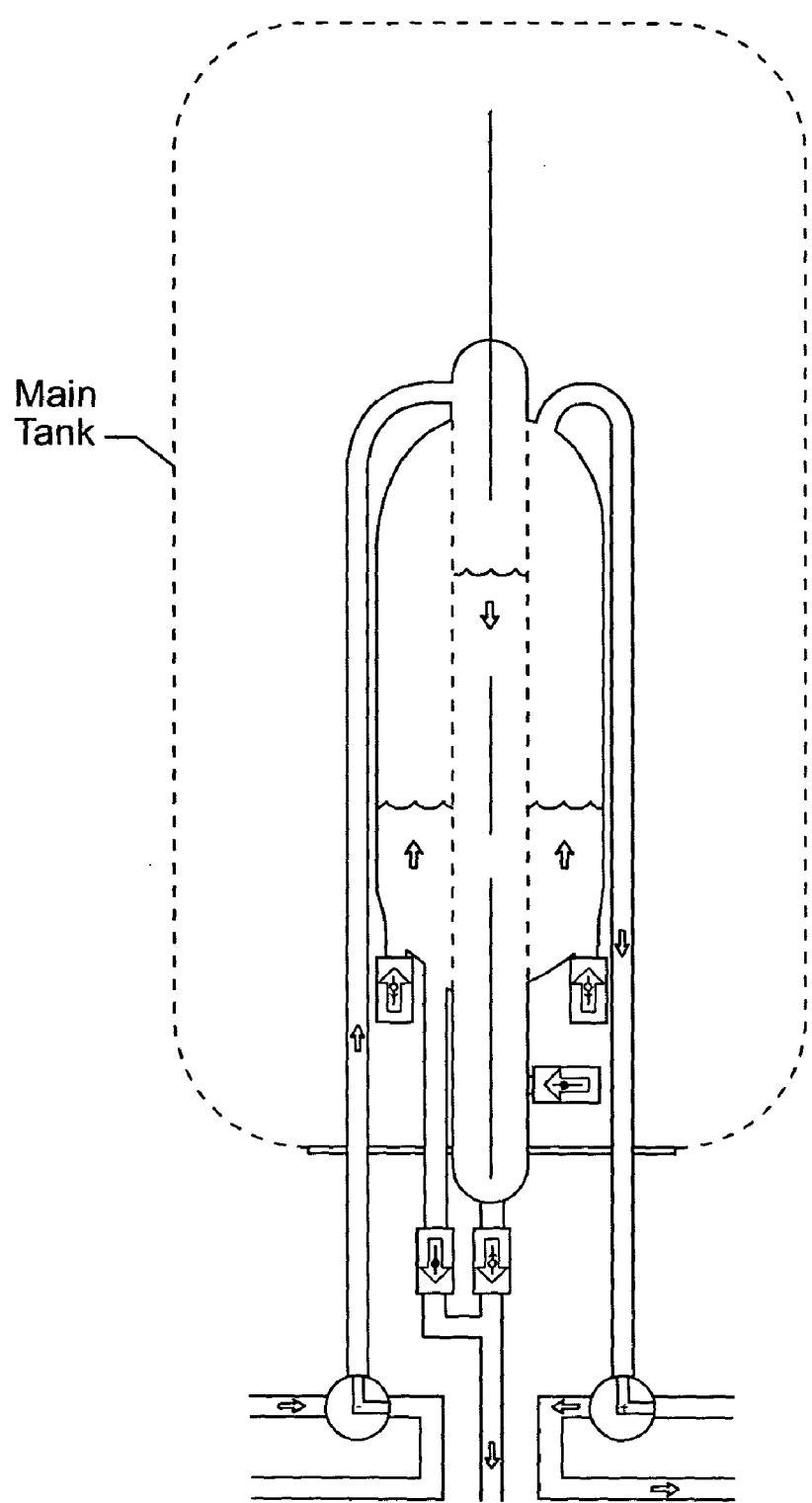
FIG. 6 is a cross sectional view of the dual chamber pump showing the auxiliary chamber dispensing fluid while the main chamber is being filled.
Figure 7:
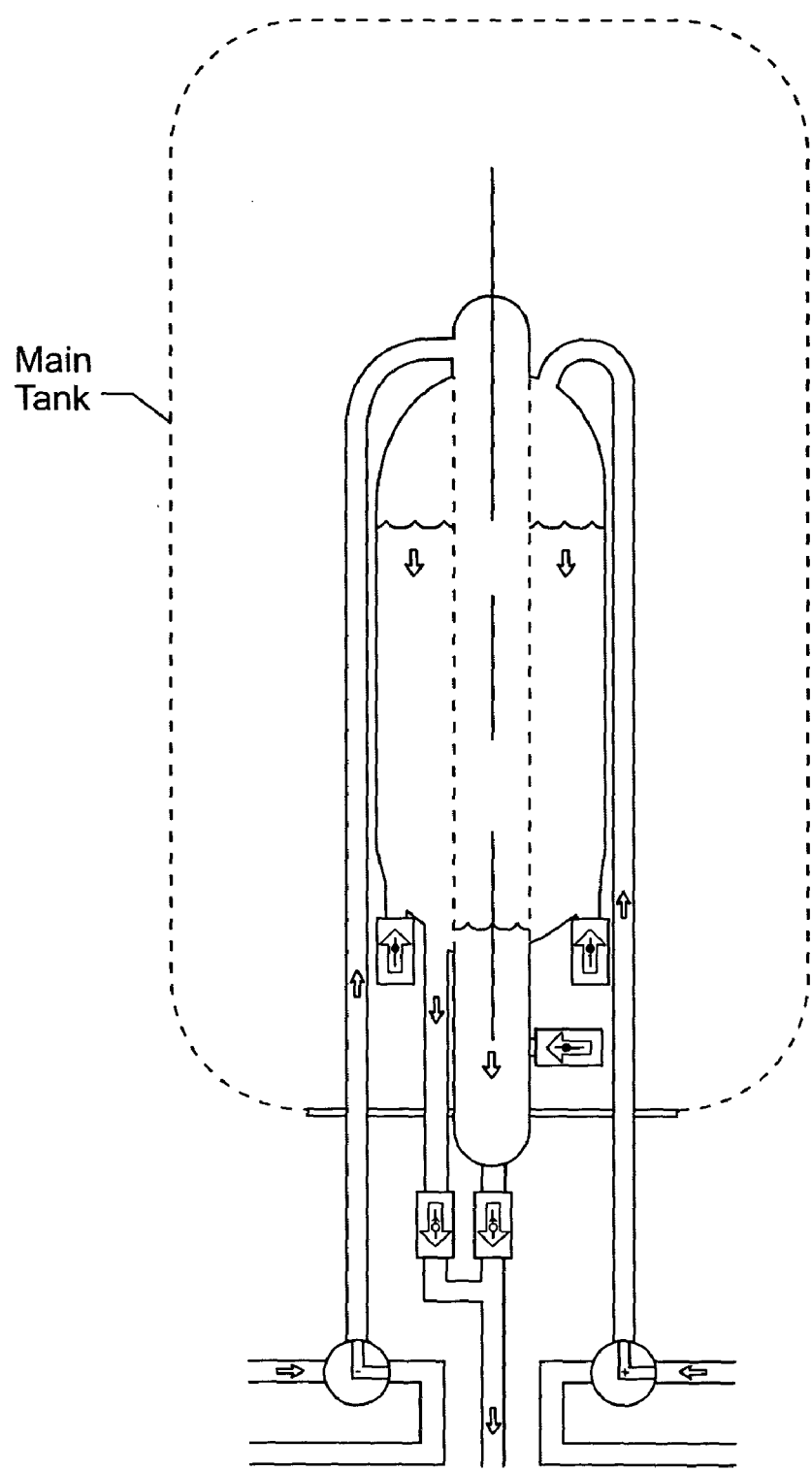
FIG. 7 is a cross sectional view of the dual chamber pump showing both chambers dispensing fluid after the main chamber has been filled and pressurized with fluid.

The operation of the dual pump starts with both chambers filled and the outer chamber two position valve 44 being set to pressurize and the auxiliary chamber three position valve 46 being set to seal. In the rocket application, a valve (not shown) is opened so that fluid may flow from the main chamber 26 through the check valve 38 to the engine, as shown in FIG. 4. Now referring to FIG. 5, when the outer float 24 reaches a point designated as the low set point, the auxiliary chamber 10 is pressurized and the fluid briefly flows from both chambers. After flow is established from the auxiliary chamber 10, the main chamber 26 is vented by switching the two position valve 44 to vent and fluid flows under low pressure from the storage tank 6 into the main chamber 26, while simultaneously fluid flows at high pressure from the auxiliary chamber 10 through the check valve 40 to the engine, as shown in FIG. 6. Once the fluid within the main chamber reaches a point designated as the high set point, the main chamber two position valve 44 is set to pressurize. At this point, fluid is delivered briefly from both chambers, as shown in FIG. 7, and then the auxiliary chamber 10 three position valve 46 is set to vent. While fluid is being delivered from the main chamber 26, the auxiliary chamber 10 fills to a point designated as the auxiliary chamber set point. Then, the auxiliary chamber three position valve is set to seal the auxiliary chamber 10 until the main chamber 26 reaches the low set point. Then the cycle repeats itself, until instructed otherwise by the control system.

The dual chamber pump is located within the storage tank 6, which is pressurized to a relatively low pressure. Under this pressure, the main chamber fills quickly. For example, the main chamber may fill in one second and then dispense for four seconds. The auxiliary chamber would fill in, for example, three seconds and dispense for 1.5 seconds, allowing time for overlap between the fill and dispense cycles. The cycle time should be five to ten times longer than the time required to vent and refill or pressurize the main chamber, otherwise, the cycle time is inefficient and some of the pressurized gas is lost.

Figure 2:
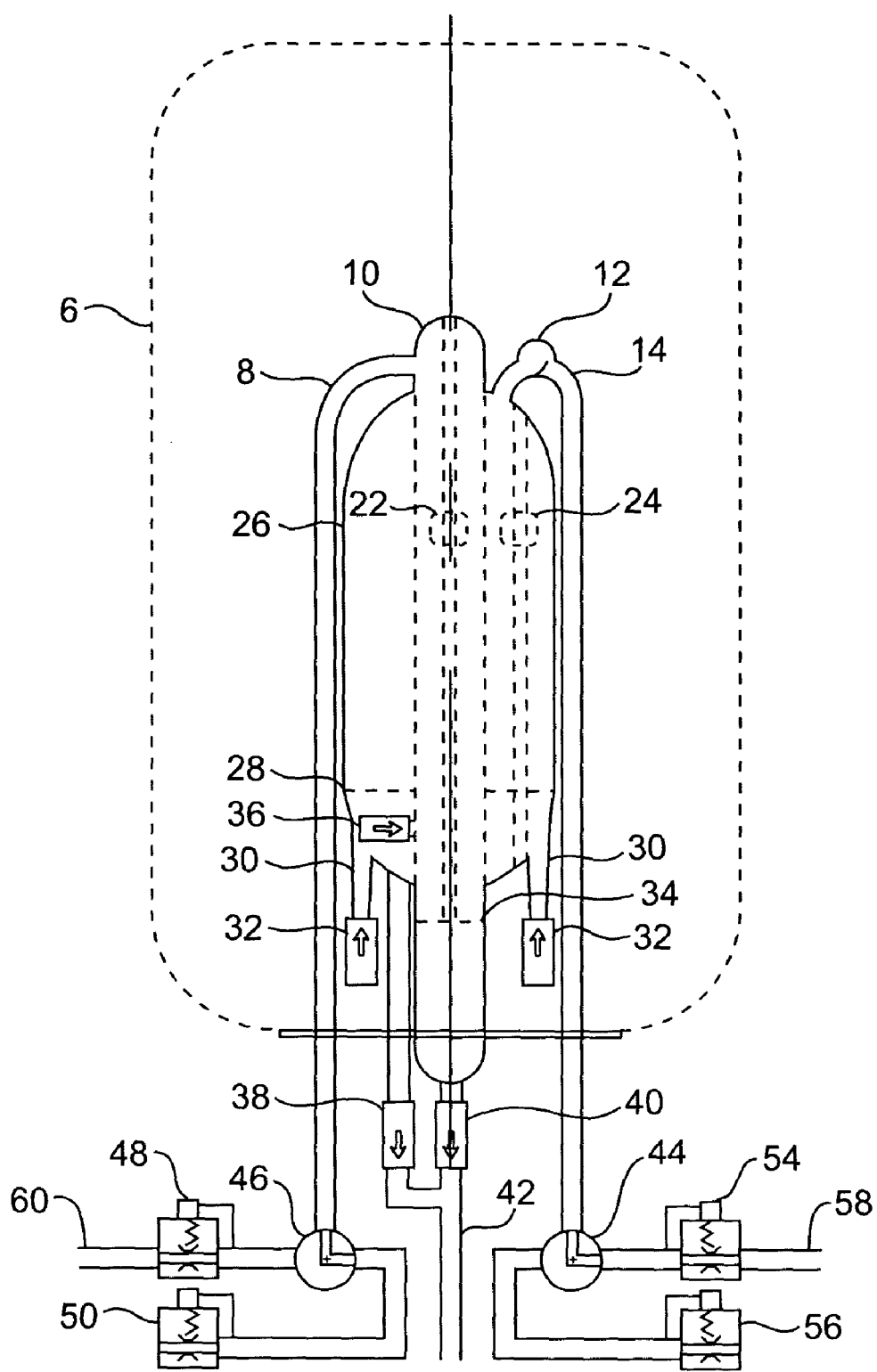
FIG. 2 is a cross sectional view of an alternative embodiment of a dual chamber pump with an alternate valve arrangement according to the present disclosure.

The alternative embodiment shown in FIG. 2 fills the auxiliary chamber from the primary chamber. In this embodiment, the auxiliary chamber pressure would not need to fall below the main tank pressure, only needing to fall slightly below the primary chamber pressure in order to fill. This embodiment may be used to reduce pressure fluctuations in the output.

Figure 3:
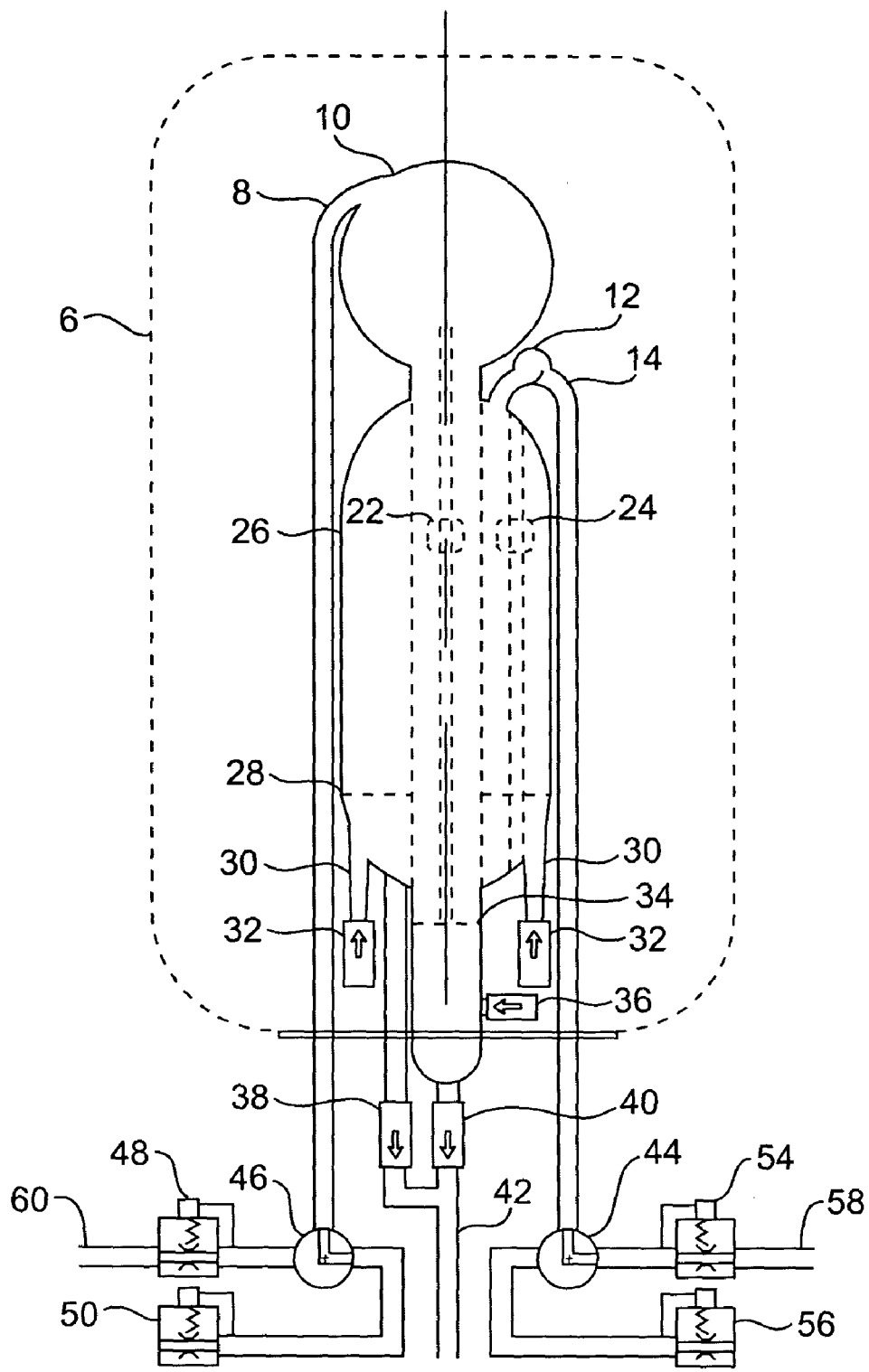
FIG. 3 is a cross sectional view of an alternative embodiment of a dual chamber pump with the chambers generally stacked serially in relation with each other.

The alternative embodiment shown in FIG. 3 will result in a lower mass pump system, as the primary chamber does not need to include the volume of the auxiliary chamber. The primary chamber may be spherical instead of cylindrical as shown. This will further lower the mass of the pump system.

The pneumatics and hydraulics for the level sensing and valve system may be accomplished by a number of capable methods. The level sensors may be reed switches actuated by magnetic floats or capacitive, acoustical, inductive or optical level sensors. For sensing the level of fluid, in the case of liquid oxygen, the magnetic properties may be utilized. The valves which pressurize and vent the pump chambers can be spool valves, ball valves, piloted solenoid valves, poppet valves or the like. The back pressure regulators may be replaced by valves that quickly shut before the pressure falls below the setpoint.

The pump chambers may also be located outside of the storage tank. A float or diaphragm may separate the gas and liquid portions of the pump chamber so that a wider variety of pressurizing gases may be used. Insulating walls or floats may be used so that if the pressurizing gas is at high temperatures, the gas will not be cooled excessively during a pump cycle by contact with the liquid being pumped.

The pressurizing gas may be helium, liquid helium, which is heated at the engine, or gas from a gas generator. Other gases such as nitrogen or liquid nitrogen may be used instead to minimize cost of the rocket system. If a liquid is to be pumped and then converted into a gas to drive the dual chamber pump disclosed, another dual chamber pump as disclosed herein may be used to pump the liquid. For a lower weight system, the gas which runs the fuel pump may be recondensed by the use of a heat exchanger in the fuel tank, which is then pressurized and then vaporized at the engine so that it could be reused, thus saving weight. Steam can also be used as a pressurizing gas.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A pneumatically driven dual chamber pump, comprising:
    a primary chamber with a primary chamber volume capacity;
    an auxiliary chamber with an auxiliary chamber volume capacity;
    the auxiliary chamber volume capacity being smaller than the primary chamber volume capacity; and
    a pump outlet coupled to both the primary chamber and the auxiliary chamber.

2. The dual chamber pump of claim 1, wherein the auxiliary chamber is located generally internally of the primary chamber.

3. The dual chamber pump of claim 1, wherein the primary chamber and the auxiliary chamber are generally located internally of a storage tank.

4. The dual chamber pump of claim 3, wherein the primary chamber and the auxiliary chamber are generally located above or below the storage tank.

5. The dual chamber pump of claim 3, further comprising a valve system having at least one intake and at least one outlet valve, the combined flow capacity of the at least one intake valve exceeding the combined flow capacity of the outlet valve, for filling the primary chamber or the auxiliary chamber at a fill rate that is greater than an empty rate.

6. The dual chamber pump of claim 3, wherein the primary chamber volume capacity is at least 25% larger than the auxiliary chamber volume capacity.

7. The dual chamber pump of claim 5, further comprising pressure control means to prevent the pressure in the dual chamber pump from falling below the vapor pressure of the fluid.

8. The dual chamber pump of claim 5, further comprising a diffuser downstream of the valve system to minimize turbulence in the dual chamber pump.

9. The dual chamber pump of claim 5, further comprising a baffler substantially internal to either the primary chamber or the auxiliary chamber to reduce the dynamic pressure of the flow while the chamber is being filled.

10. The dual chamber pump of claim 9, wherein the baffler comprises a porous screen.

11. The dual chamber pump of claim 1, wherein the primary chamber further has a primary chamber major axis and the auxiliary chamber is coaxially aligned with the primary chamber major axis.

12. A pneumatically driven dual chamber pump, comprising:
    a primary chamber with a primary chamber volume capacity; and
    an auxiliary chamber with an auxiliary chamber volume capacity, the auxiliary chamber volume capacity being smaller than the primary chamber volume capacity; and
    wherein the primary chamber and the auxiliary chamber are generally located internally of a storage tank that is located internally of a rocket system.

13. A pneumatically driven dual chamber pump, comprising:
    a primary chamber with a primary chamber volume capacity; and
    an auxiliary chamber with an auxiliary chamber volume capacity, the auxiliary chamber volume capacity being smaller than the primary chamber volume capacity; and
    wherein the primary chamber and the auxiliary chamber are generally located internally of a storage tank, the primary chamber pumps fluid the majority of the time, and the auxiliary chamber pumps fluid when the primary chamber is refilling with fluid.

14. The dual chamber pump of claim 13, further comprising liquid seperation means to seperate liquid from gas during a venting step of the pump cycle.

15. The dual chamber pump of claim 14, wherein the liquid is returned to the primary chamber during a pressurization step of the pump cycle.

* * * * *